(12) United States Patent
Isshiki et al.

(10) Patent No.: US 8,139,243 B2
(45) Date of Patent: Mar. 20, 2012

(54) INFORMATION PROCESSING APPARATUS, CONTROL METHOD, AND COMPUTER-READABLE MEDIUM FOR DISTRIBUTED PROCESSING OF PRINT JOBS

(75) Inventors: Naohiro Isshiki, Kawasaki (JP);
Yukihiko Shimizu, Urayasu (JP);
Noriyuki Kobayashi, Kawasaki (JP);
Takeshi Namikata, Yokohama (JP);
Atsushi Matsumoto, Tokyo (JP);
Tomohiro Akiba, Tokyo (JP); Takeshi Suwabe, Tokyo (JP); Akira Negishi, Kawasaki (JP); Hidehiko Yokoyama, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1088 days.

(21) Appl. No.: 11/197,459

(22) Filed: Aug. 5, 2005

(65) Prior Publication Data
US 2006/0028677 A1 Feb. 9, 2006

(30) Foreign Application Priority Data

Aug. 5, 2004 (JP) .................................. 2004-229768

(51) Int. Cl.
*G06F 3/12* (2006.01)
(52) U.S. Cl. ...................................................... 358/1.15
(58) Field of Classification Search .................. 358/1.15
See application file for complete search history.

(56) References Cited

U.S. PATENT DOCUMENTS

| | | | | |
|---|---|---|---|---|
| 4,882,752 A | * | 11/1989 | Lindman et al. | 713/166 |
| 6,606,165 B1 | * | 8/2003 | Barry et al. | 358/1.9 |
| 6,609,162 B1 | | 8/2003 | Shimizu et al. | 710/15 |
| 6,717,689 B1 | * | 4/2004 | Endo et al. | 358/1.15 |
| 7,099,027 B1 | * | 8/2006 | Barry et al. | 358/1.15 |
| 2003/0208644 A1 | | 11/2003 | Shimizu et al. | 710/15 |
| 2004/0187022 A1 | * | 9/2004 | Asada et al. | 713/200 |
| 2005/0151997 A1 | * | 7/2005 | Murakami et al. | 358/1.16 |
| 2006/0245004 A1 | * | 11/2006 | Okamoto et al. | 358/448 |

FOREIGN PATENT DOCUMENTS

| | | |
|---|---|---|
| JP | 08-115277 | 5/1996 |
| JP | 2001-121781 A | 5/2001 |
| JP | 2001-325041 | 11/2001 |
| JP | 2004-126859 A | 4/2004 |
| JP | 2004-127310 A | 4/2004 |
| JP | 2004-157874 | 6/2004 |
| JP | 2004-186810 A | 7/2004 |
| WO | 2004/031936 A1 | 4/2004 |

OTHER PUBLICATIONS

English Translation of Japan patent JP 08-115277, May 1996.*
Chinese Office Action dated Aug. 11, 2006, of corresponding Chinese Patent Application.

* cited by examiner

*Primary Examiner* — Benny Tieu
*Assistant Examiner* — Qian Yang
(74) *Attorney, Agent, or Firm* — Fitzpatrick, Cella, Harper & Scinto

(57) ABSTRACT

A print job often includes secret information, and information may suffer sniffing from devices that execute distributed processing of jobs, or on the network. Therefore, executing the distributed processing of a print job including secret information reduces the robustness in terms of security protection. Hence, upon reception of a job, a task manager (TM) issues, to a dynamic job scheduler (DJS), a request of target devices of distributed processing according to a security level indicating the importance level of data included in that job. The DJS notifies the TM of the target devices, and the TM transmits divided jobs to the target devices.

5 Claims, 11 Drawing Sheets

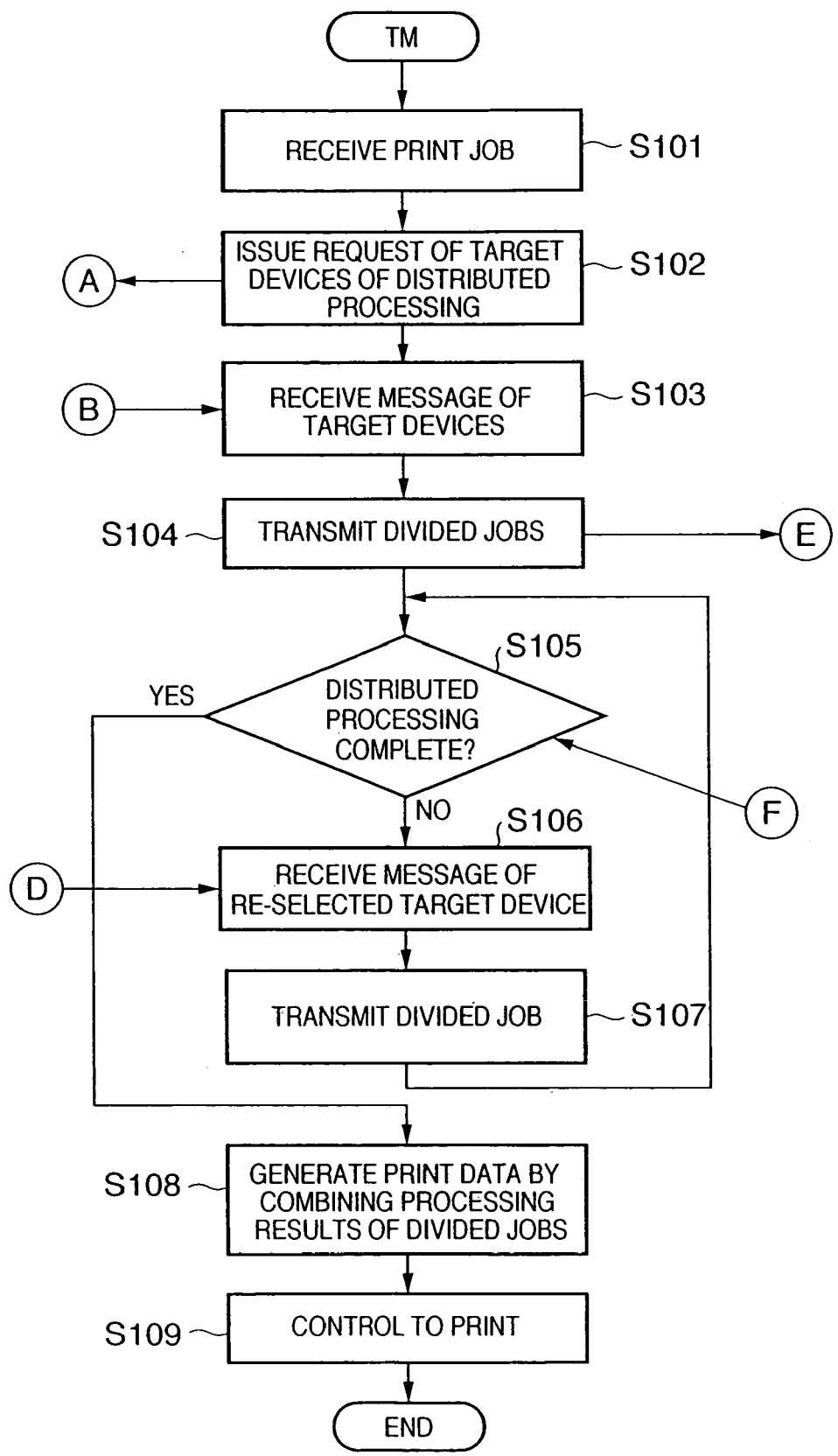

FIG. 8

| DEVICE | SECURITY FUNCTION |
|---|---|
| PRINTER 10 | SSL(SSL COMMUNICATION FUNCTION)<br><br>HDD DATA ERASURE<br>(HDD DATA ERASURE FUNCTION)<br><br>HDD DATA ENCRYPTION<br>(HDD DATA ENCRYPTION FUNCTION) |
| PRINTER 11 | SSL<br>HDD DATA ERASURE<br>HDD DATA ENCRYPTION |
| PRINTER 12 | NONE |
| PRINTER 21 | HDD DATA ERASURE |
| PRINTER 22 | SSL<br>HDD DATA ERASURE<br>HDD DATA ENCRYPTION |
| PRINTER 23 | SSL<br>HDD DATA ERASURE<br>HDD DATA ENCRYPTION |
| ALL PCS | SSL |

FIG. 9

| SECURITY LEVEL | TARGET DEVICE | PRACTICAL EXAMPLE |
|---|---|---|
| 0 | ALL DEVICES ON GRID SYSTEM | |
| 1 | DEVICES WHICH BELONG TO IDENTICAL SEGMENT | PRINTER 10, 11, 12, 21, 22, PC 30, 31 |
| 2 | DEVICES WHICH HAVE SSL FUNCTION | PRINTER 10, 11, 22, 23 PC 30, 31, 32 |
| 3 | DEVICES WHICH BELONG TO IDENTICAL SEGMENT AND HAVE SSL FUNCTION | PRINTER 10, 11, PC 30, 31 |
| 4 | DEVICES WHICH BELONG TO IDENTICAL SEGMENT AND HAVE SSL FUNCTION AND HDD DATA ERASURE FUNCTION | PRINTER 10,11, 22, |
| 5 | DEVICES WHICH BELONG TO IDENTICAL OFFICE ROOM AND HAVE SSL FUNCTION, HDD DATA ERASURE FUNCTION, AND HDD DATA ENCRYPTION FUNCTION | PRINTER 10, 11 |
| 6 | DEVICES WHICH BELONG TO IDENTICAL OFFICE ROOM AND SEGMENT, AND HAVE SSL FUNCTION, HDD DATA ERASURE FUNCTION, AND HDD DATA ENCRYPTION FUNCTION | PRINTER 10,11 |
| 7 | NO DISTRIBUTED PROCESSING IS PERFORMED | PRINTER 10 |

INFORMATION PROCESSING APPARATUS, CONTROL METHOD, AND COMPUTER-READABLE MEDIUM FOR DISTRIBUTED PROCESSING OF PRINT JOBS

FIELD OF THE INVENTION

The present invention relates to an information processing apparatus and its control method, and an image processing method and, more particularly, to a case wherein the distributed load system of grid computing is applied to information processing apparatuses such as printers, multi-functional peripheral equipments, and the like connected to the computer network.

BACKGROUND OF THE INVENTION

In recent years, studies about implementation of high-speed processing by collectively exploiting the CPU powers of computers using the grid computing technology have been extensively made in science-related studies, and applications to built-in devices have been proposed.

FIG. 1 is a diagram for explaining the architecture of grid computing. There are several types of grids. A grid to be described below is of a type called a desktop grid, which executes a job by utilizing an idle time of a CPU of a desktop PC or the like.

A client PC shown in FIG. 1 inputs a job in accordance with a user's instruction (S1). That request (job) is passed to a task manager (to be abbreviated as "TM" hereinafter), which informs a dynamic job scheduler (to be abbreviated as "DJS" hereinafter) of the contents (job request) (S2). The DJS which manages the resources of the overall grid computing system selects brokers of optimal resources and informs the TM of the selected brokers (S3). Note that the resource means an idle state of a CPU of a PC.

The broker in each PC registers, in the DJS, resource information which is retrieved by a resource manager (to be abbreviated as "RM" hereinafter) in the PC. Upon reception of a request from the TM (S4), the broker inputs a job to the RM (S5), and notifies the TM of completion of the job (and the processing result) (S6). The TM inputs jobs to the brokers selected by the DJS, and monitors the status of these jobs. Upon reception of a completion message (and processing result) from each broker (S6), the TM sends a completion message (and processing result) to the client PC (S7).

The RM notifies the broker of the resource information, and inputs a job to the resource in accordance with a broker's instruction. The RM periodically checks the status of the resource. If the RM finds a change or abnormality of the resource (e.g., a trouble, reception of another job, or the like), it advises the broker accordingly.

With this scheme, the implementation form of desktop grid computing is to allow distributed processing by distributing jobs to the resources of optimal CPUs (which are not used normally).

When such grid computing technology is applied to image formation in an office, the CPU resources are information processing apparatuses such as a PC, server, image forming apparatus, multi-functional peripheral equipment, and the like on a local area network (LAN).

FIG. 2 is a diagram for explaining the arrangement when the desktop grid computing technology is applied to printer description language (PDL) processing. In the description of FIG. 1, modules which form the grid are handled as independent ones. However, when the desktop grid computing technology is applied to a printer, a plurality of modules exist in a single device in general.

A client PC 901 in FIG. 2 issues a print instruction (inputs a print job) to a printer 902. The printer 902 has functions of the TM and DJS (i.e., it serves as a host machine of the distributed processing), and PCs 903 to 905 have functions of the broker and RM. This arrangement allows distributed processing based on grid computing using, e.g., three PCs connected to a network 907.

A job (print job of PDL format data) input from the client PC 901 is distributed to respective resources (e.g., the first page of that job to the PC 903, the second page to the PC 904, and the third page to the PC 905) by the TM and DJS of the printer 902 as the host machine, and these PCs execute rendering processes from the PDL data to image data. In this case, the printer 902 simultaneously transmits an application program for the image rendering processing of PDL data to the respective resources. The printer 902 as the host machine collects images rendered based on the PDL data by the PCs (i.e., the processing results of images of the first to third pages), prints out images 906 for three pages, and notifies the client PC 901 of completion of the print job.

Of course, the target resources of this distributed processing may be four or more PCs, the resource on the client PC 901 as a job input source may be used, and other printer resources on the network 907 may be used.

Meanwhile, information may suffer sniffing from devices that execute distributed processing of jobs, or during communication processes of divided jobs and those of the processing results, i.e., on the network. On the other hand, a print job to be received by an image forming apparatus or multi-functional peripheral equipment often includes secret information. Hence, executing the distributed processing of a print job including secret information by a plurality of devices is to reduce the robustness in terms of security protection.

SUMMARY OF THE INVENTION

The first aspect of the present invention discloses an information processing apparatus connected to a computer network, which receives a job via the computer network, obtains target resource information indicating target resources of distributed processing in accordance with information indicating the importance level of data included in the job, divides the job in accordance with the target resource information, and transmits the divided jobs to the target resources via the computer network, and the divided jobs distributed to and processed by the target resources are gathered at an image processing apparatus after the distributed processing.

The second aspect of the present invention discloses an information processing apparatus connected to a computer network, which selectively sets the importance level of data included in a job, obtains information of resources which may execute distributed processing of the job in accordance with the set importance level of the data, displays the obtained information of resources on a monitor, and transmits the job to image processing apparatuses via the computer network.

The third aspect of the present invention discloses image processing which selects a security level, transmits a job to one or more printers determined in accordance with the security level selected in the security level selection step, and controls the printer selected in the printer selection step to print the job processed by the one or more printers.

According to the present invention, appropriate security can be assured while sufficiently obtaining the effect of high-speed processing by utilizing the grid computing technology.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 7A to 7C are flowcharts for explaining the operations of a DJS, TM, and broker and RM of a device that processes a divided job, when a print job is input from the PC to a printer;

FIG. 8 is a table showing the security functions of respective devices; and

FIG. 9 is a table showing the relationship between the security levels and target devices of distributed processing.

DETAILED DESCRIPTION OF THE PREFERRED EMBODIMENTS

Preferred embodiments of the present invention will be described in detail hereinafter with reference to the accompanying drawings.

[Hardware Arrangement of Image Forming Apparatus]

Figure 3:
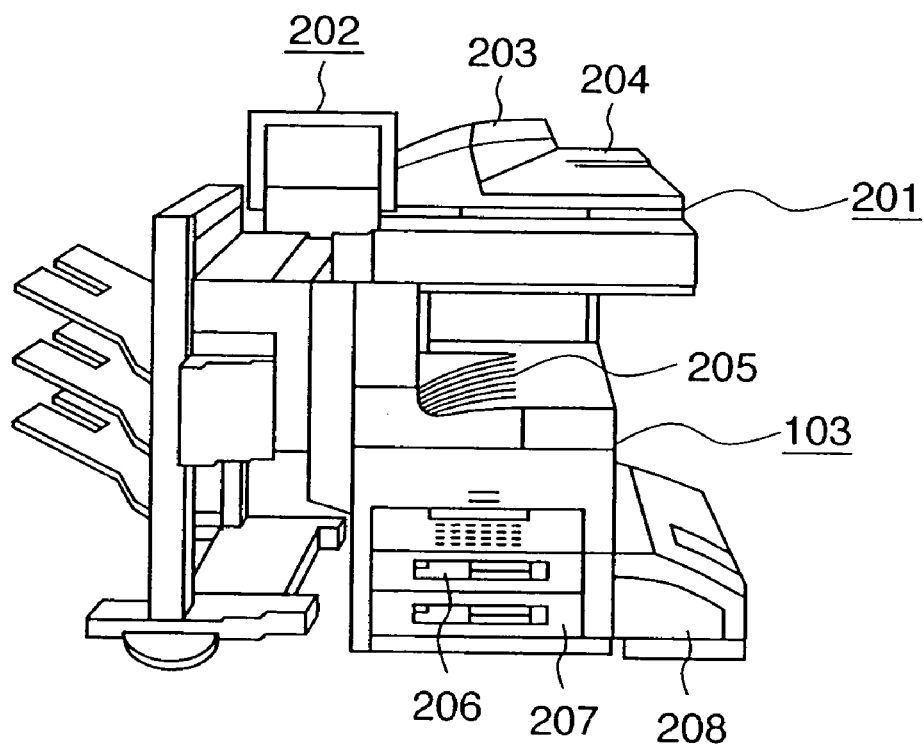
FIG. 3 shows an outer appearance of an image forming apparatus having a copy function.

FIG. 3 shows an outer appearance of an image forming apparatus having a copy function according to this embodiment.

A scanner 201 as an image input device illuminates a document image with light, and generates a raster image by a CCD line sensor (not shown). When the user sets documents on a tray 203 of a document feeder 204, and inputs a document image scan instruction at a control panel 202, a printer controller 102 (to be described later) instructs the scanner 201 to scan an image. The scanner 201 feeds documents set on the tray 203 to an image scanning unit one by one to scan document images.

The control panel 202 is a user interface which is used to set various operations such as a document scan operation, copy operation, and the like, and displays the status of the image forming apparatus.

A printer engine 103 as an image output device prints a raster image on a print sheet. As the print scheme of the printer engine, an electrophotography scheme that uses a photosensitive drum or belt, an ink-jet scheme that prints an image on a print sheet by ejecting ink from an array of small nozzles, and the like may be used, and the print scheme is not particularly limited. Note that the print operation is executed in accordance with an instruction from the printer controller 102 (to be described later).

The printer engine 103 has a plurality of paper feed stages that allow the user to select different print sheet sizes and different orientations of print sheets, and has print sheet cassettes 206, 207, and 208 corresponding to the paper feed stages. An exhaust tray 205 receives the printed print sheets.

Figure 4:
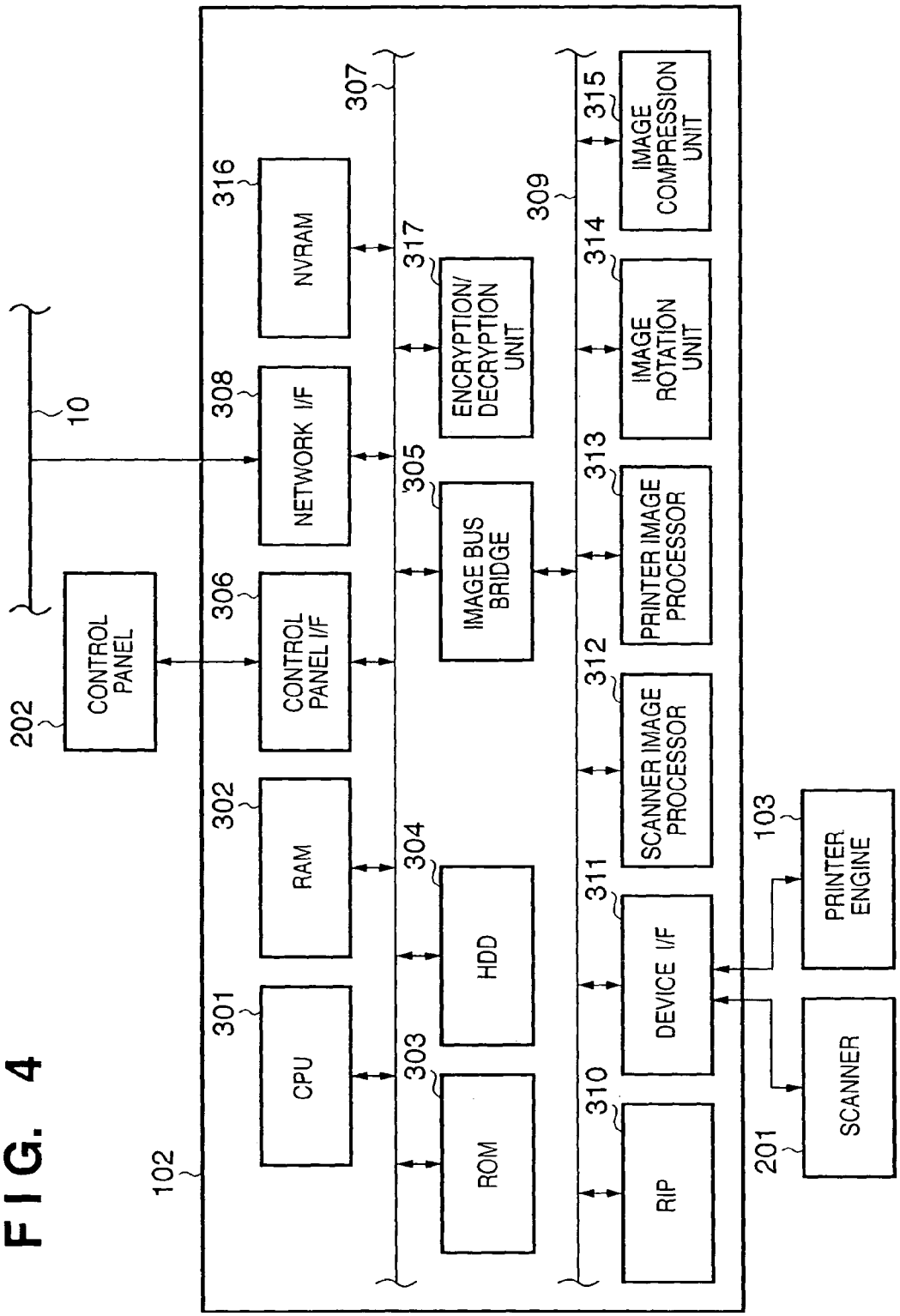
FIG. 4 is a block diagram showing the arrangement of a printer controller which controls the image forming apparatus.

FIG. 4 is a block diagram showing the arrangement of the printer controller 102 which controls the image forming apparatus.

The printer controller 102 is connected to the scanner 201 and printer engine 103, and is also connected to a network 10 such as a LAN or the like via a network interface (I/F) 308 to exchange image data, print data, device information, and the like with a PC as a host machine.

A CPU 301 executes programs stored in a ROM 303 and hard disk drive (HDD) 304 using a RAM 302 as a work memory, and controls respective components (to be described below) via a system bus 307. Note that the RAM 302 is also used as an image memory for temporarily storing image data, and the ROM 303 also serves as a boot ROM that stores a boot program of the system. The HDD 304 stores programs of various processes including system software and programs that implement a DJS, TM, broker, and RM (to be described later), various data, and the like. As will be described in detail later, the data read/write process of the HDD 304 is accompanied by the encryption/decryption process of an encryption/decryption unit 317.

A control panel I/F 306 is an interface with the control panel 202. The CPU 301 outputs image data to be displayed on an LCD of the control panel 202 to the control panel 202 via the control panel I/F 306. Information input by the user by operating the control panel 202 is supplied to the CPU 301 via the control panel I/F 306. The CPU 301 stores environment setting information such as an operation mode and the like input from the control panel 202 in a nonvolatile memory (NVRAM) 316.

An image bus bridge 305 connects the system bus 307 and an image bus 309 that transfers image data at high speed, and mutually converts the structures of data that flow through these buses. The following devices are set on the image bus 309.

A raster image processor (RIP) 310 rasterizes image data in the page description language (PDL) format received from the network 10 into a bitmap image. A device I/F 311 is an interface between the scanner 201 and printer engine 103, and converts synchronization/asynchronization of image data transfer.

A scanner image processor 312 applies shading correction, gamma correction, color space conversion, modify/edit process, and the like to image data input from the scanner 201. A printer image processor 313 applies image processes such as undercolor removal (UCR), masking process, gamma correction, edge emphasis or smoothing, resolution conversion, and the like to image data to be output to the printer engine 103. An image rotation unit 314 applies image rotation to image data as needed. An image compression unit 315 applies a JPEG (Joint Photographic Image Coding Experts Group) compression/decompression process to multi-valued image data or a compression/decompression process such as JBIG (Joint Bi-level Image Group), MMR (Modified Modified READ), MH (Modified Huffman), and the like to binary image data, as needed.

[Arrangement of Grid System]

Figure 1:
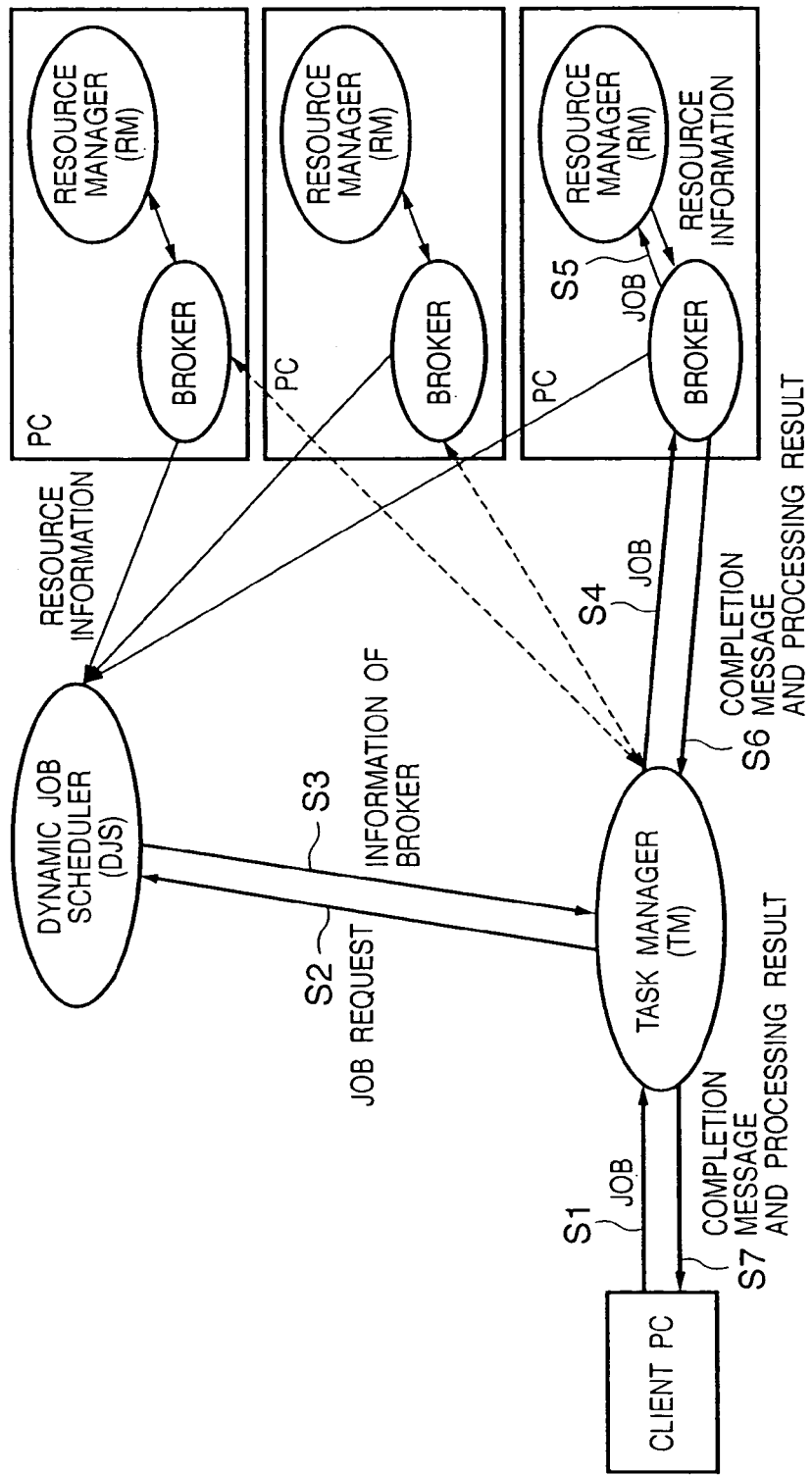
FIG. 1 is a diagram for explaining the architecture of grid computing.
Figure 2:
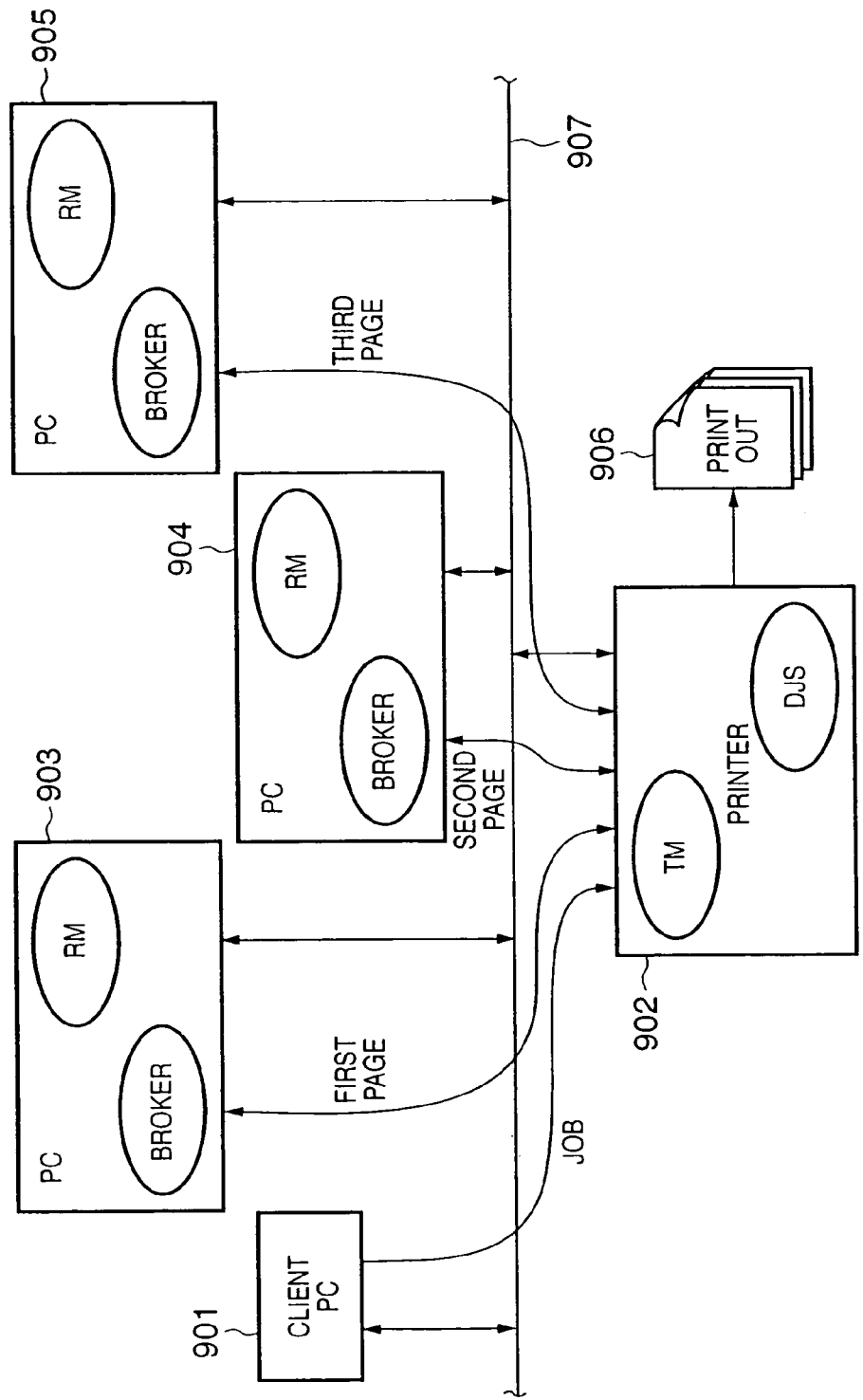
FIG. 2 is a diagram for explaining the arrangement when the desktop grid computing technology is applied to printer description language (PDL) processing.
Figure 5:
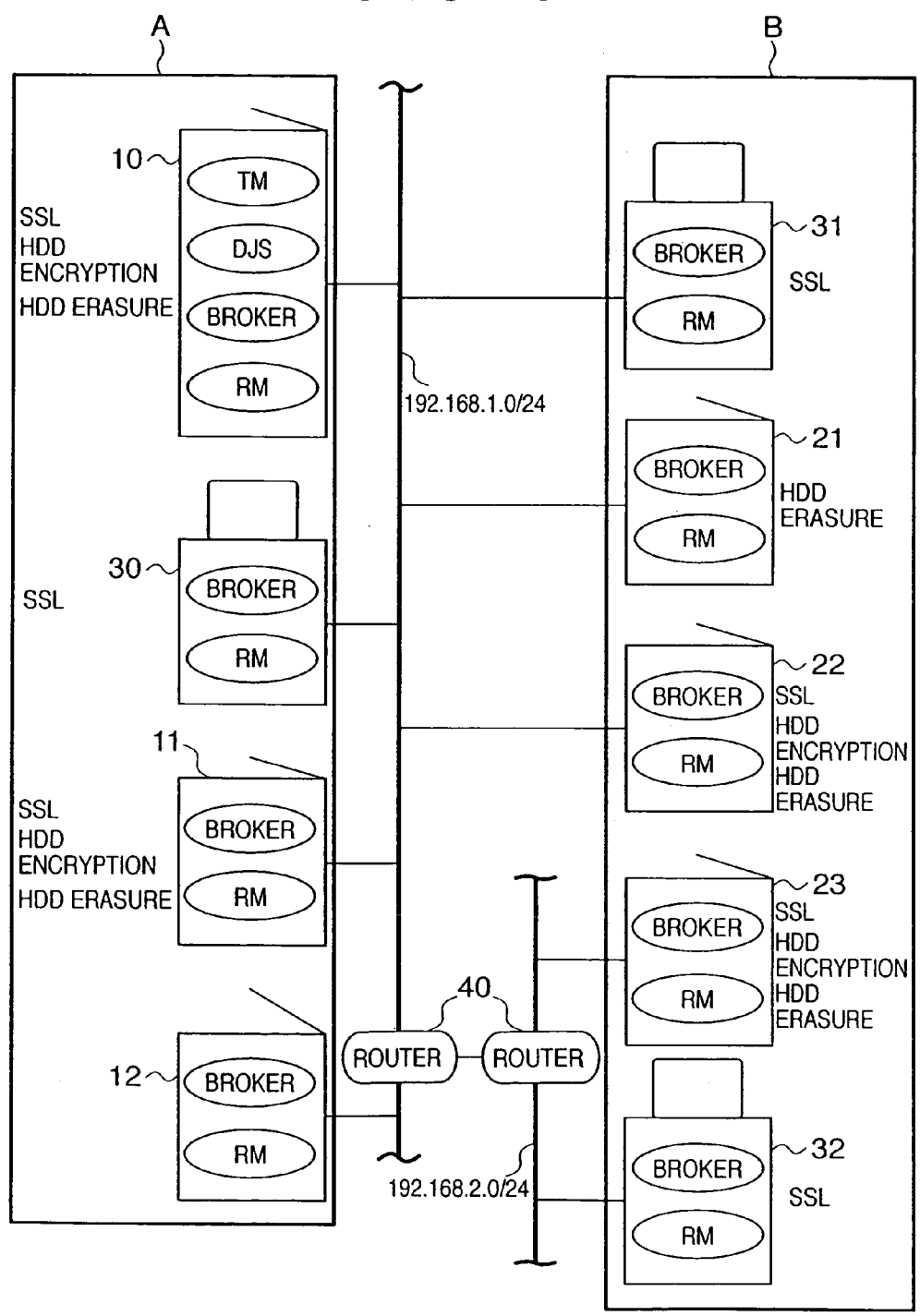
FIG. 5 is a diagram for explaining the arrangement of a grid system and grid framework.

FIG. 5 is a diagram for explaining the arrangement of a grid system and a grid framework. Note that the grid computing technology as the background is the same as that explained using FIGS. 1 and 2.

Printers 10, 11, 12, 21, 22, and 23 shown in FIG. 5 are image processing apparatuses described using FIGS. 3 and 4, and PCs 30, 31, and 32 are general-purpose desktop personal computers.

The printer 10 has a Security Socket Layer (SSL) communication function required to securely make network communication by encryption, an HDD data erasure function of rapidly erasing data stored in the HDD 304 in the device if it need not be held in the device upon, e.g., completion of a job, and an HDD data encryption function of storing data in the HDD 304 after encryption. FIG. 8 shows the security functions of the respective devices. Note that the information shown in FIG. 8 can be displayed on the user interface of a printer driver in response to a predetermined instruction (e.g., issuance of a help display command or the like) from the user.

The printers 10, 11, and 12 and the PC 30 are physically set in office room A, and are connected to the network segment with a subnet address 192.168.1.0/24. The printers 21 and 22 and the PC 31 are physically set in office room B, and are connected to the network segment with the subnet address 192.168.1.0/24. The printer 23 and PC 32 are physically set in office room B, and are connected to the network segment with a subnet address 192.168.2.0/24. The network segments are connected to each other via routers 40, and IP addresses are dynamically or statically assigned to the devices connected to these network segments. Therefore, the devices shown in FIG. 5 can communicate with each other.

A TM and DJS that manage the resources of the entire grid system run on the printer 10. Also, brokers and RMs run on all the printers 10, 11, 12, 21, 22, and 23, and all the PCs 30, 31, and 32. Each RM registers resource information of the device on which that RM runs in the DJS via the broker. Note that the resource information includes an idle state of a CPU, idle state of a memory, location, IP address, presence/absence of an SSL function, presence/absence of an HDD data erasure function, and presence/absence of an HDD data encryption function of each printer or PC. Note that the resource information is normally registered by the RM in the DJS via the broker. However, static resource information except for the idle state of the CPU, idle information of the memory and the like as dynamic resource information may be stored in advance in the NVRAM 316 by operating the control panel 202 of the printer 10.

[Print Setting]

Figure 6:
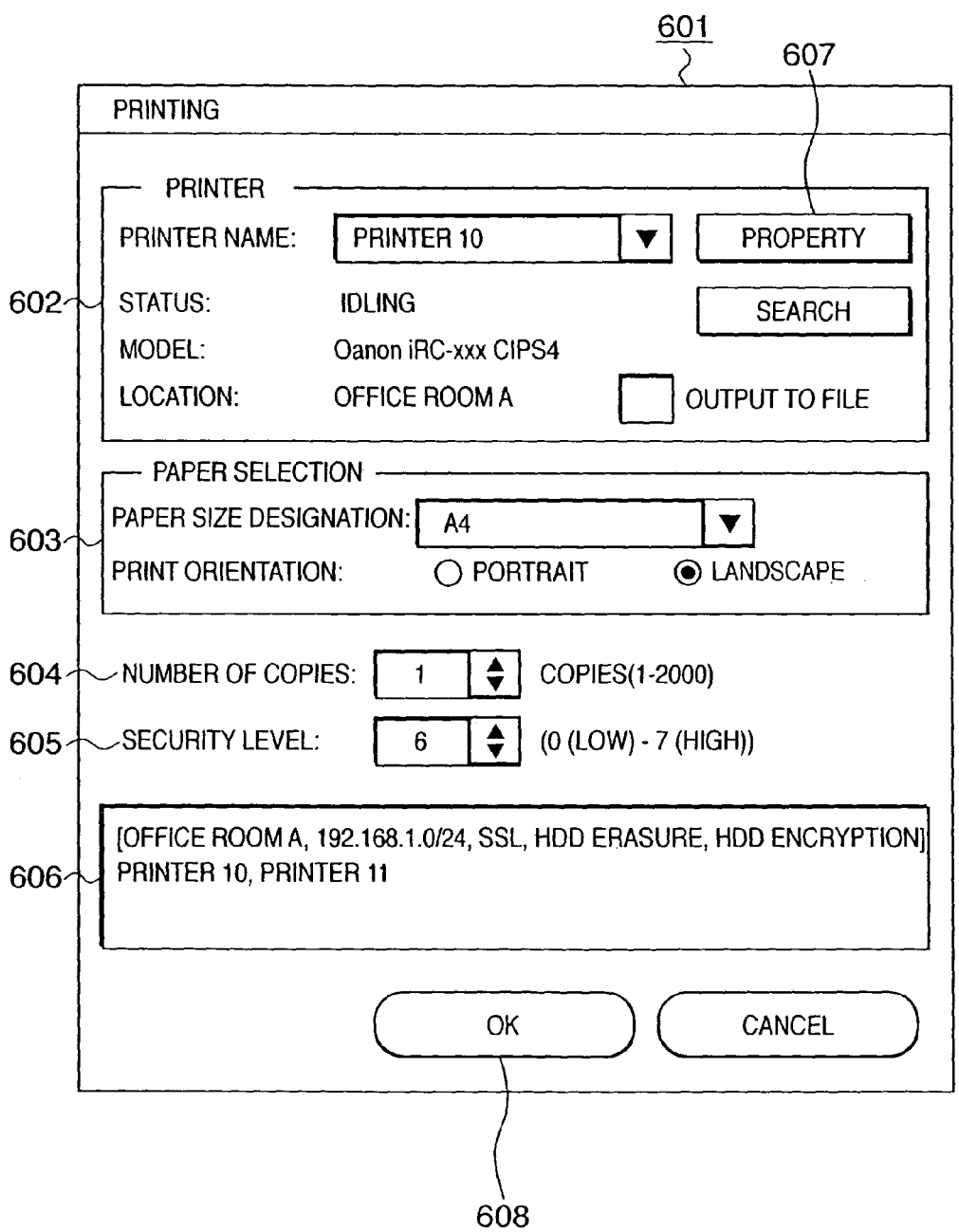
FIG. 6 shows an example of a print setting dialog to be displayed by a printer driver that runs on a PC when a print job is input from the PC.

FIG. 6 shows an example of a print setting dialog 601 to be displayed by a printer driver which runs on the PC when a print job is input from the PC.

The user can designate a print sheet size, the number of copies to be printed, a print orientation, a printer used in printing, a security level of a print job, and the like using the print setting dialog 601.

An area 602 on the print setting dialog 601 is an area that allows the user to select a printer used in printing, and displays information of the selected printer (the printer 10 in FIG. 6). When the user presses a property button 607 while the printer is selected, a property setting dialog (not shown) is displayed to allow the user to make detailed settings such as color/monochrome printing, two-sided printing, a layout, an orientation of a print sheet, a color profile, settings of various finishers, a digital watermark, box storage, and the like.

The user selects a print sheet size and a print orientation using an area 603, sets the number of copies to be printed using a copy number setting field 604, and selects a security level according to the importance level of print data or image data included in a print job between lowest and highest levels "0" and "7" using a security level setting field 605. Note that the security strength increases (security becomes stricter) with increasing numerical value of the security level.

An area 606 displays security conditions (displayed contents in [ ]) of the grid system, and target devices of distributed processing (in other words, devices that meet the security conditions) in accordance with the selected security level. After the security level is selected, the PC inquires the DJS of the security conditions and target devices corresponding to the selected security level. Therefore, the user can recognize a device range in which distributed processing is likely to be executed in correspondence with the selected security level with reference to the displayed contents on the area 606, and can easily determine whether or not he or she sets an appropriate security level.

In the example of FIG. 6, security level "6" is selected. In this case, the printer of user's choice on the area 602, and devices which are set in the same office room, are connected to the same network segment, and have the SSL communication function, HDD data erasure function, and HDD data encryption function, are selected as target devices of the distributed processing. In the example of FIG. 6, since the printer 10 is selected on the area 602, only the printer 11 which is set in the same office room, is connected to the same network segment, and has the three functions meets the security conditions, and is likely to be a target device used in the distributed processing of a print job.

Note that the target devices of the distributed processing are normally informed by the DJS. Alternatively, static resource information may be registered in the PC 30 in advance, and target devices may be displayed based on the resource information.

Basic print information (print sheet size, print orientation, the number of copies, and security level) which can be set on the print setting dialog 601 can also be similarly set on the property setting dialog. If the basic print information is set on the property setting dialog, the settings are reflected on the print setting dialog 601.

Upon completion of the settings on the print setting dialog 601, the user presses an OK button 606 to notify the CPU of the PC 30 of completion of the settings.

[Input of Print Job]

Figure 7A:
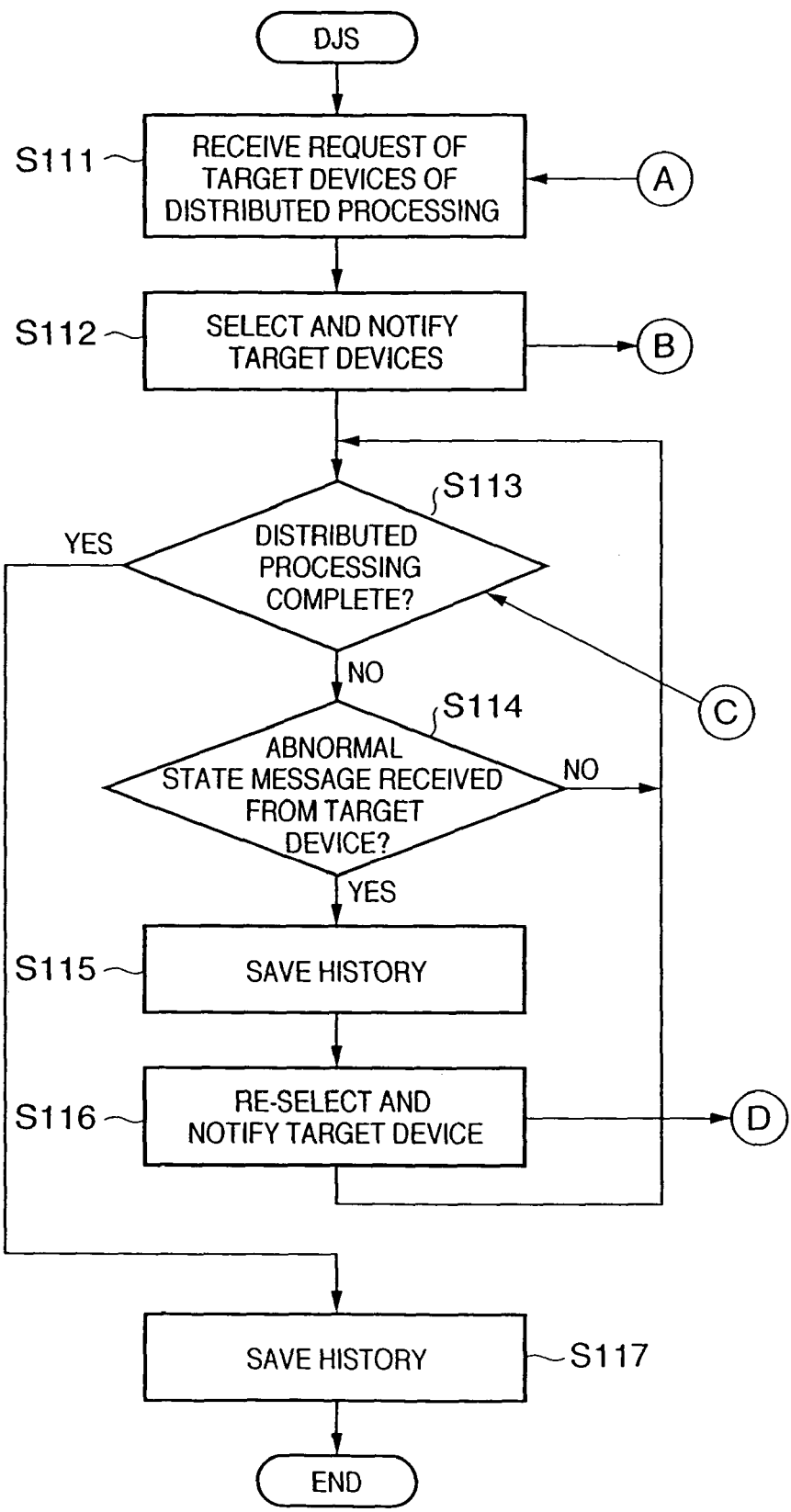
Figure 7C:
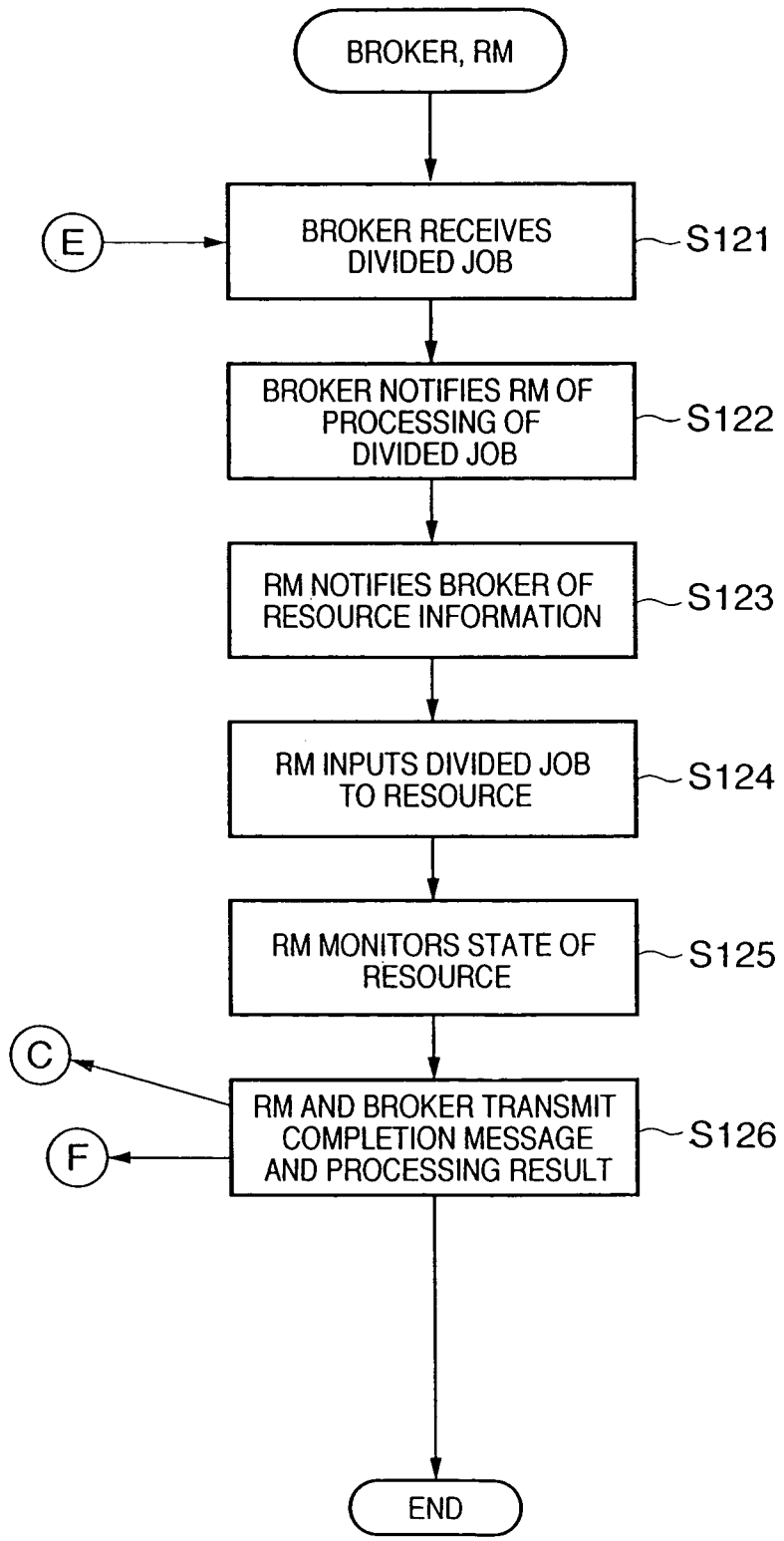

FIGS. 7A to 7C are flowcharts for explaining the operations of the DJS, TM, and the broker and TM of the device which processes a divided job, when a print job is input from the PC to the printer.

Upon reception of a print job (S101), the TM of the printer 10 issues a request of target devices of distributed processing to the DJS (S102).

Upon reception of the request of target devices of the distributed processing (S111), the DJS selects target devices used in the distributed processing of the print job on the basis of the information indicating the security level included in the print job, and the resource information of the PCs and printers, and notifies the TM of the selected target devices (S112). FIG. 9 shows the relationship between the security levels and target devices of the distributed processing.

Upon reception of the message of the target devices (S103), the TM of the printer 10 transmits divided jobs to one or a plurality of brokers of the target devices when the distributed processing is to be executed (S104). As a division unit of the job, band, page, and job units can be used, and the TM selects one of these units.

Each divided job is processed by the resource of each device via the broker and RM of that device.

For example, if the printer 11 becomes the target device, and the divided job is received (S121), the broker of the printer 11 notifies the RM of the processing of the divided job (S122). Upon reception of the message of the divided job, the RM notifies the broker of resource information (an idle state of the printer 11) (S123), and inputs the divided job to the resource (printer 11) in accordance with an instruction of the broker (S124). After that, the RM periodically monitors the state of the resource (printer 11), and notifies the broker of any abnormality if it finds it (S125). Note that the abnormal state includes the core business of the printer 11 (e.g., when the PC inputs a print job that designates the printer 11), and the processing of the divided job cannot be continued in that state. Upon completion of the processing of the divided job, the RM and broker transmit a completion message to the DJS, and a completion message and processing result to the TM (S126), thus ending the processing associated with the divided job.

The DJS and TM check if the completion messages of the divided jobs are received from all the devices to which the divided jobs are assigned (S113, S105). Upon reception of the completion messages of the divided jobs, the DJS and TM determine that the distributed processing is complete, and the flow advances to steps S117 and S108. If the distributed processing is not complete yet, the flows advance to steps S114 and S106.

The DJS checks if an abnormal state message is received from each target device (S114). Upon reception of the abnormal state message, the DJS saves the contents and time of occurrence of the abnormality as a history (S115), re-selects the target device which has the security level to process the divided job of interest, and notifies the TM of the re-selected target device (S116). Upon reception of this message (S106), the TM transmits the divided job of interest to the newly selected device (S107).

If it is determined that the distributed processing is complete, the DJS saves its history (S117), and ends the processing associated with the print job of interest. On the other hand, the TM generates print data by combining the processing results of the divided jobs received from the target devices (S108), and controls the printer 10 to execute a print process of that print data (S109), thus ending the processing associated with the print job of interest.

As described above, since the target devices of the distributed processing are selected in accordance with the security level set in a print job, a high security level is set for a print job which includes data with a high importance level and requires higher security, and that print job undergoes distributed processing using secure devices. On the other hand, a low security level is set for a print job that requires low security, and that print job can undergo distributed processing using many devices. A print job set with the highest security level can be processed by only the designated printer without any distributed processing.

Therefore, high security can be appropriately assured while sufficiently obtaining the effect of high-speed processing using the grid system.

Note that the TM and DJS that control the grid system run on the printer 10 in the above example. Alternatively, the TM and DJS may run on a server or another PC. Also, the physical layout may include not only a room unit such as office rooms and the like, but also the concepts of a department unit such as a business department, administrative department, and the like, a floor unit such as the first floor, second floor, and the like, a building unit such as building A, building B, and the like, and so forth.

As described above, the security level determined by a combination of encryption of a network communication, erasure of data stored in a storage medium in a printer, and encrypted storage of data in the storage medium is designated using the security level setting field 605 shown in FIG. 6, and a printer name is selected on the printer driver. In this manner, a job is transmitted to one or more printers determined in accordance with the security level, and the distributed processing can be performed while realizing the security that the user intended, thus attaining high-speed processing. The processing results from the one or more printers are printed by the printer selected on the printer driver. In this manner, even when the user does not recognize the security levels of the printers, high-speed processing can be performed using the printers with appropriate security level. When a print request is input to each of the one or more printers, that printer is excluded from the distributed processing. Hence, the distributed processing that effectively uses printers in a processing wait state can be made.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

CLAIM OF PRIORITY

This application claims priority from Japanese Patent Application No. 2004-229768, filed on Aug. 5, 2004, which is hereby incorporated by reference herein.

What is claimed is:

1. An information processing apparatus connected to a computer network, the apparatus comprising:
   a receiver, arranged to receive a print job from a client computer via the computer network, the print job including information indicating an image processing apparatus to perform printing for the received print job and a numeral indicating a security level of data included in the print job;

an obtainer, arranged to obtain resource information from a plurality of information processing devices;

a determiner, arranged to determine a processing method of the received print job based on the numeral indicating the security level and the obtained resource information, wherein, in a first case that the numeral corresponds to a low security level, a plurality of target resources of distributed processing of the received print job is determined from the plurality of information processing devices having subnet addresses corresponding to a network segment to which the image processing apparatus belongs and, in a second case that the numeral corresponds to a medium security level, the plurality of target resources of distributed processing is determined from the plurality of information processing devices having the subnet addresses and an encryption function and, in a third case that the numeral corresponds to a high security level, the determiner determines that the received print job is to be processed using the image processing apparatus and that the distributed processing is not to be performed; and a divider, arranged to divide the received print job into a plurality of divided jobs based on a division unit and the resource information of the plurality of target resources of distributed processing in the first or second cases; and a transmitter, arranged to transmit the plurality of divided jobs to the plurality of target resources of distributed processing via the computer network in the first or second cases, and to transmit the received print job to the image processing apparatus via the computer network to perform printing for the received print job in the third case, wherein the plurality of divided jobs is processed by the plurality of target resources of distributed processing, the plurality of divided jobs is gathered to the image processing apparatus after the distributed processing, and the plurality of divided jobs is combined to perform printing for the received print job by the image processing apparatus.

2. The apparatus according to claim 1, wherein, in a case that the distributed processing is not completed by the determined target resources, the determiner determines another plurality of target resources of distributed processing of the received print job from the plurality of information processing devices.

3. The apparatus according to claim 1, further comprising a provider configured to provide information to be displayed on a user interface of the client computer, wherein the user interface is configured to set the image processing apparatus to perform printing for the print job, and the security level of data included in the print job, and wherein the user interface displays information received from the provider as a response to a setting, and the information indicates both one or more target resources of distributed processing determined to meet security conditions in accordance with the setting, and one or more security functions of the target resources.

4. A method of controlling an information processing apparatus connected to a computer network, the method comprising:

receiving a print job from a client computer via the computer network, the print job including information indicating an image processing apparatus to perform printing for the received print job and a numeral indicating a security level of data included in the print job;

obtaining resource information from a plurality of information processing devices;

determining a processing method of the received print job based on the numeral indicating the security level and the obtained resource information, wherein, in a first case that the numeral corresponds to a low security level, a plurality of target resources of distributed processing of the received print job is determined from the plurality of information processing devices having subnet addresses corresponding to a network segment to which the image processing apparatus belongs and, in a second case that the numeral corresponds to a medium security level, the plurality of target resources of distributed processing is determined from the plurality of information processing devices having the subnet addresses and an encryption function and, in a third case that the numeral corresponds to a high security level, a determination is made that the received print job is to be processed using the image processing apparatus and that the distributed processing is not to be performed;

dividing the received print job into a plurality of divided jobs based on a division unit and the resource information of the plurality of target resources of distributed processing in the first or second cases; and transmitting the plurality of divided jobs to the plurality of target resources of distributed processing via the computer network in the first or second cases, and transmitting the received print job to the image processing apparatus via the computer network to perform printing for the received print job in the third case, wherein the plurality of divided jobs is processed by the plurality of target resources of distributed processing, the plurality of divided jobs is gathered to the image processing apparatus after the distributed processing, and the plurality of divided jobs is combined to perform printing for the received print job by the image processing apparatus.

5. A non-transitory computer-readable medium storing a computer-executable program for causing a computer to perform a method of controlling an information processing apparatus connected to a computer network, the method comprising:

receiving a print job from a client computer via the computer network, the print job including information indicating an image processing apparatus to perform printing for the received print job and a numeral indicating a security level of data included in the print job;

obtaining resource information from a plurality of information processing devices;

determining a processing method of the received print job based on the numeral indicating the security level and the obtained resource information, wherein, in a first case that the numeral corresponds to a low security level, a plurality of target resources of distributed processing of the received print job is determined from the plurality of information processing devices having subnet addresses corresponding to a network segment to which the image processing apparatus belongs and, in a second case that the numeral corresponds to a medium security level, a plurality of target resources of distributed processing is determined from the plurality of information processing devices having the subnet addresses and an encryption function and, in a third case that the numeral corresponds to a high security level, a determination is made that the received print job is to be processed using the image processing apparatus and that the distributed processing is not to be performed; and dividing the received print job into a plurality of divided jobs based on a division unit and the resource information of the plurality of target resources of distributed processing in the first or second cases; and transmitting the plurality of divided jobs to the plurality of target resources of distributed processing via the computer network in the first and second cases, and transmitting the received print job to the image processing apparatus via the computer network to perform printing for the received print job in the third case, wherein the plurality of divided jobs is processed by the plurality of target resources of distributed processing, the plurality of divided jobs is gathered to the image processing apparatus after the distributed processing, and the plurality of divided jobs is combined to perform printing for the received print job by the image processing apparatus.

* * * * *